(12) United States Patent
Torone et al.

(10) Patent No.: US 7,765,501 B2
(45) Date of Patent: Jul. 27, 2010

(54) SETTINGS AND CONSTRAINTS VALIDATION TO ENABLE DESIGN FOR OPERATIONS

(75) Inventors: Alexander Torone, Sammamish, WA (US); Geoffrey Outhred, Seattle, WA (US); David S. Noble, Redmond, WA (US); William E. Gibson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 10/809,088

(22) Filed: Mar. 25, 2004

(65) Prior Publication Data

US 2005/0251783 A1 Nov. 10, 2005

Related U.S. Application Data

(63) Continuation-in-part of application No. 10/789,440, filed on Feb. 26, 2004, now Pat. No. 7,072,807.

(60) Provisional application No. 60/452,736, filed on Mar. 6, 2003.

(51) Int. Cl.
  *G06F 9/45* (2006.01)
  *G06F 17/50* (2006.01)
  *G06F 9/44* (2006.01)
  *G06F 15/177* (2006.01)

(52) U.S. Cl. .............................. 716/5; 717/126; 709/220

(58) Field of Classification Search ................ 709/220, 709/200; 716/5; 717/126
See application file for complete search history.

(56) References Cited

U.S. PATENT DOCUMENTS

| | | | |
|---|---|---|---|
| 6,112,243 A | 8/2000 | Downs et al. | |
| 6,374,357 B1 * | 4/2002 | Mohammed et al. | 726/5 |
| 6,754,816 B1 | 6/2004 | Layton et al. | |
| 6,779,016 B1 | 8/2004 | Aziz et al. | |
| 6,782,408 B1 | 8/2004 | Chandra et al. | |
| 6,836,750 B2 | 12/2004 | Wong et al. | |
| 7,350,068 B2 | 3/2005 | Anderson et al. | |
| 6,880,002 B2 | 4/2005 | Hirschfeld et al. | |
| 6,895,534 B2 | 5/2005 | Wong et al. | |
| 6,922,791 B2 | 7/2005 | Mashayekhi et al. | |
| 6,963,981 B1 | 11/2005 | Bailey et al. | |
| 6,990,666 B2 | 1/2006 | Hirschfeld et al. | |
| 7,013,462 B2 | 3/2006 | Zara et al. | |
| 7,058,826 B2 | 6/2006 | Fung | |
| 7,058,858 B2 | 6/2006 | Wong et al. | |
| 7,076,633 B2 | 7/2006 | Tormasov et al. | |
| 7,082,464 B2 | 7/2006 | Hasan et al. | |

(Continued)

OTHER PUBLICATIONS

Unpublished U.S. Appl. No. 11/427,041 filed on Jun. 28, 2006.

(Continued)

*Primary Examiner*—Jack Chiang
*Assistant Examiner*—Suresh Memula
(74) *Attorney, Agent, or Firm*—Workman Nydegger

(57) ABSTRACT

Systems and methods for designing systems that include computer applications hosted on hosting environments are disclosed. The hosting environments are modeled to include hosting environment settings and constraints placed on applications. The applications are also modeled to include application settings and constraints placed on the hosting environments. Hosting environment and application models are then used to validate designs by confirming that settings are in compliance with the constraints.

17 Claims, 6 Drawing Sheets

U.S. PATENT DOCUMENTS

| | | |
|---|---|---|
| 7,093,005 B2 | 8/2006 | Patterson |
| 7,124,289 B1 | 10/2006 | Suorsa |
| 7,127,625 B2 | 10/2006 | Farkas et al. |
| 7,131,123 B2 | 10/2006 | Suorsa et al. |
| 7,134,011 B2 | 11/2006 | Fung |
| 7,139,930 B2 | 11/2006 | Mashayekhi et al. |
| 7,143,420 B2 | 11/2006 | Radhakrishnan |
| 7,146,353 B2 | 12/2006 | Garg et al. |
| 7,152,109 B2 | 12/2006 | Suorsa et al. |
| 7,152,157 B2 | 12/2006 | Murphy et al. |
| 7,162,509 B2 | 1/2007 | Brown |
| 7,194,439 B2 | 3/2007 | Kassan et al. |
| 7,194,616 B2 | 3/2007 | Axnix et al. |
| 7,200,530 B2 | 4/2007 | Brown |
| 7,225,441 B2 | 5/2007 | Kozuch et al. |
| 7,231,410 B1 | 6/2007 | Walsh et al. |
| 7,257,584 B2 | 8/2007 | Hirschfeld et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,313,573 B2 | 12/2007 | Leung et al. |
| 7,333,000 B2 | 2/2008 | Vassallo |
| 7,349,891 B2 | 3/2008 | Charron et al. |
| 7,350,186 B2 | 3/2008 | Coleman et al. |
| 7,630,877 B2 | 12/2009 | Brown |
| 2002/0069369 A1 | 6/2002 | Tremain |
| 2003/0195921 A1* | 10/2003 | Becker et al. ............... 709/200 |
| 2004/0193388 A1 | 9/2004 | Outhred |
| 2004/0193703 A1* | 9/2004 | Loewy et al. ............... 709/220 |
| 2004/0199572 A1 | 10/2004 | Hunt |
| 2004/0205179 A1 | 10/2004 | Hunt |
| 2004/0225952 A1* | 11/2004 | Brown et al. ................ 714/819 |
| 2004/0226010 A1 | 11/2004 | Suorsa |
| 2005/0102383 A1* | 5/2005 | Sutler ......................... 709/223 |
| 2006/0031248 A1 | 2/2006 | Vinberg et al. |
| 2006/0034263 A1 | 2/2006 | Outhred |
| 2006/0037002 A1 | 2/2006 | Vinberg |
| 2008/0059214 A1 | 3/2008 | Vinberg |

OTHER PUBLICATIONS

Unpublished U.S. Appl. No. 11/836,418 filed on Aug. 9, 2007.

* cited by examiner

SETTINGS AND CONSTRAINTS VALIDATION TO ENABLE DESIGN FOR OPERATIONS

CROSS-REFERENCES TO RELATED APPLICATIONS

This application is a Continuation-In-Part of prior application Ser. No. 10/789,440 filed on Feb. 26, 2004, now issued as U.S. Pat. No. 7,072,807 issued Jul. 4, 2006, and therefore claims priority under 35 U.S.C. § 120 to this prior application, and further claims priority under 35 U.S.C. § 119(e) based on prior U.S. Provisional Application No. 60/452,736 filed on Mar. 6, 2003.

FIELD OF THE INVENTION

Aspects of the present invention relate to software development for distributed computing systems. More specifically, aspects of the present invention provide software tools that allow developers to conveniently identify and satisfy constraints that apply to applications and hosting environments.

BACKGROUND

Distributed computing systems typically include applications that are hosted on a plurality of computer devices. One type of distributed computer system is a data center (such as an Internet data center (IDC) or an Enterprise Data Center (EDC)), which is a specifically designed complex that houses many computers for hosting network-based services. Data centers, which may also go by the names of "Webfarms" or "server farms", typically house hundreds to thousands of computer devices that form a hosting environment and are located in climate-controlled, physically secure buildings. Each of the computer devices has operational requirements that must be met by applications hosted on the computer device. Similarly, each application has operational requirements that must be met by the hosting environment.

Applications that will be hosted on distributed computing systems are typically configured to operate with a single computer device during the development phase. For example, all of the settings associated with the application are set to meet the operational requirements of a single server. During the deployment of the application, extensive modifications to the application and hosting environment settings are often required to ensure that the application settings meet the operational requirements of the hosting environment and that the hosting environment settings meet the operational requirements of the application. This process can be time consuming and expensive.

Therefore, there is a need in the art for design tools and methods that facilitate identifying and satisfying hosting environment and application operational requirements during the design phase of an application.

BRIEF SUMMARY

Aspects of the present invention address one or more of the issues mentioned above, thereby providing design tools and methods that allow developers to identify and satisfy application and hosting environment constraints. An application is modeled such that the model includes the identification of constraints that are placed on a hosting environment that hosts the application. The hosting environment is also modeled such that the model identifies constraints that are placed on the application. During a validation stage, a design tool determines whether the constraints have been satisfied. Identifying and satisfying application and hosting environment constraints during the development phase reduces deployment modifications and the time required to deploy applications.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
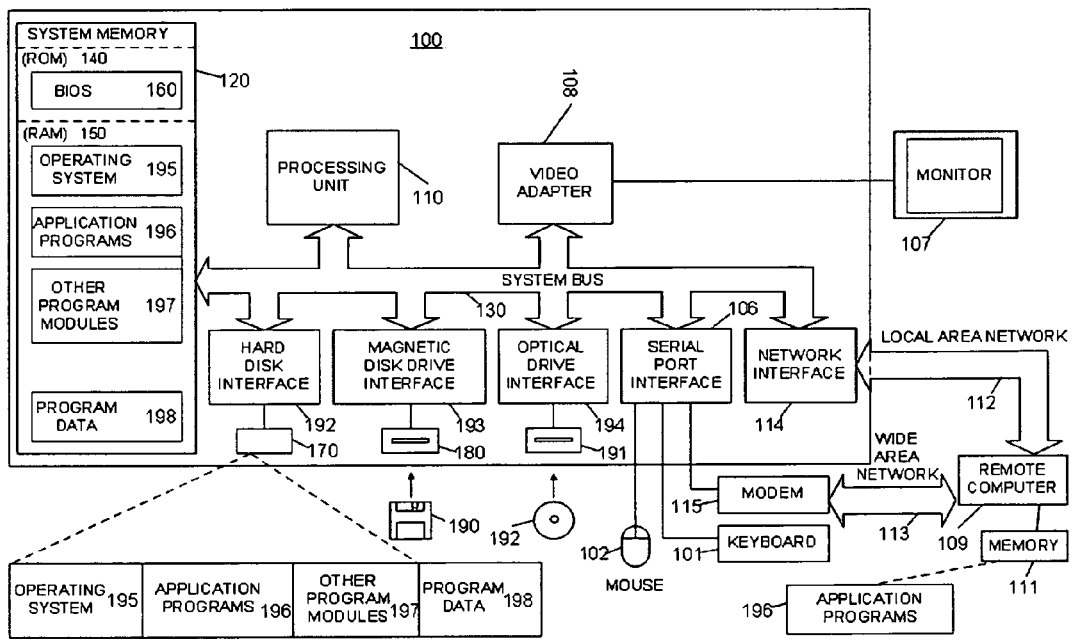
FIG. 1 shows a functional block diagram of a conventional general-purpose computer system.

FIG. 1 is a functional block diagram of an example of a conventional general-purpose digital computing environment that can be used to host design tools that implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using connections to one or more remote computers, such as a remote computer 109. The remote computer 109 can be a server, a router, a network PC, a peer device or another common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of the various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
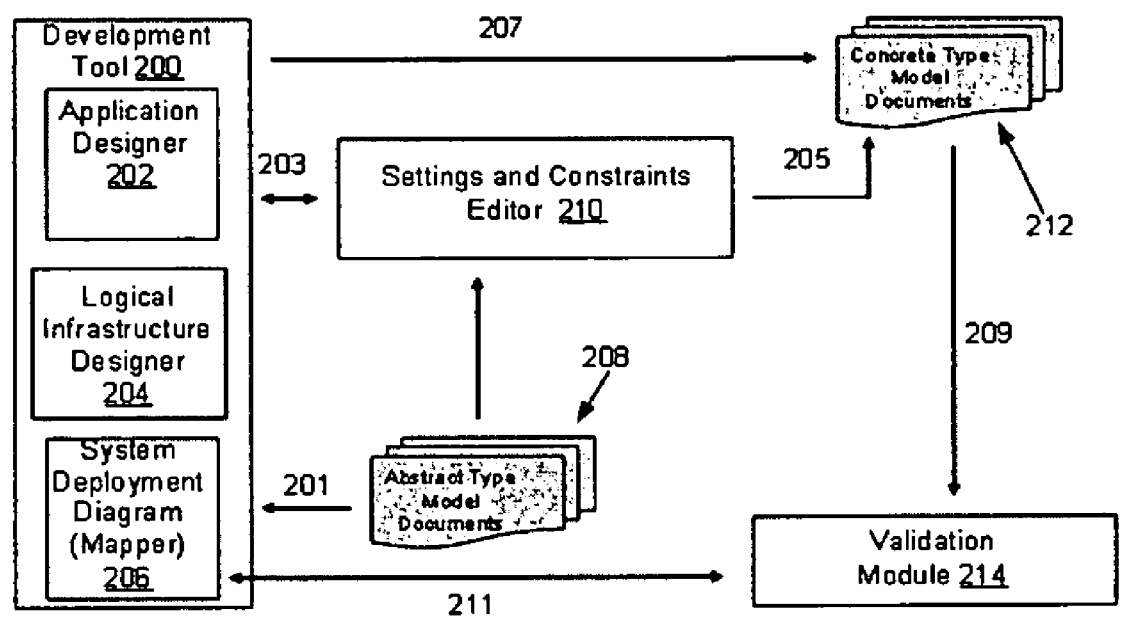
FIG. 2 shows a system and method for setting and validating application and hosting environment constraints, in accordance with an embodiment of the invention.

FIG. 2 illustrates a system and method for setting and validating application and hosting environment constraints. A development tool 200 is an application that is used to design a system. An exemplary design tool is Microsoft® Visual Studio® development system. Development tool 200 includes an application designer module 202 that provides a design surface for designing an application. A logical infrastructure designer module 204 provides a design surface for designing a hosting environment. A system deployment diagram module 206 binds the application to the hosting environment and generates a user interface that allows a developer to correct configuration errors.

Abstract type model documents 208 may include frameworks that list settings for applications and hosting environments. For example, a server may have several settings that may be set, such as whether the server only hosts web applications that use SOAP, require secure sockets, provide script access, utilize a minimum bandwidth, provide load balancing, include a minimum amount of memory, etc. Application settings may relate authentication modes and protocols, whether secure SSL is required, whether impersonating is allowed, etc.

Figure 3:
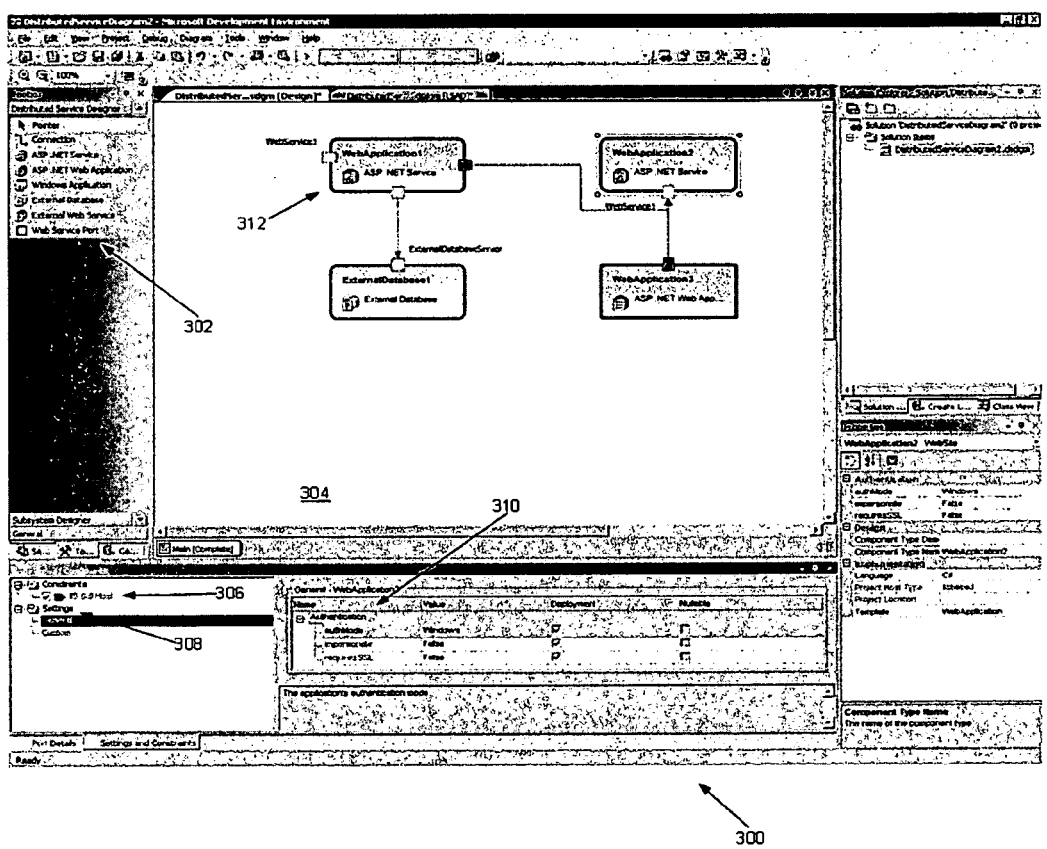
FIG. 3 shows a design surface that may be used to develop an application, in accordance with an embodiment of the invention.

When a developer selects elements when designing a system, in step 201, the abstract type model documents 208 for those elements are accessed by development tool 200. FIG. 3 shows a design surface 300 that may be used to develop an application, in accordance with an embodiment of the invention. Design surface 300 may be created with Application designer module 202. A developer may select elements from column 302 and drag them into region 304. Constraints that the application will impose on the hosting environment may be listed in section 306. Constraints section 306, for example, indicates that the application is imposing the constraint of requiring the hosting environment to be an Internet Information Services (IIS) 6.0 host. Application settings may be set by making appropriate selections in sections 308 and 310. The settings options for applications may be obtained from abstract type model documents 208.

Figure 4:
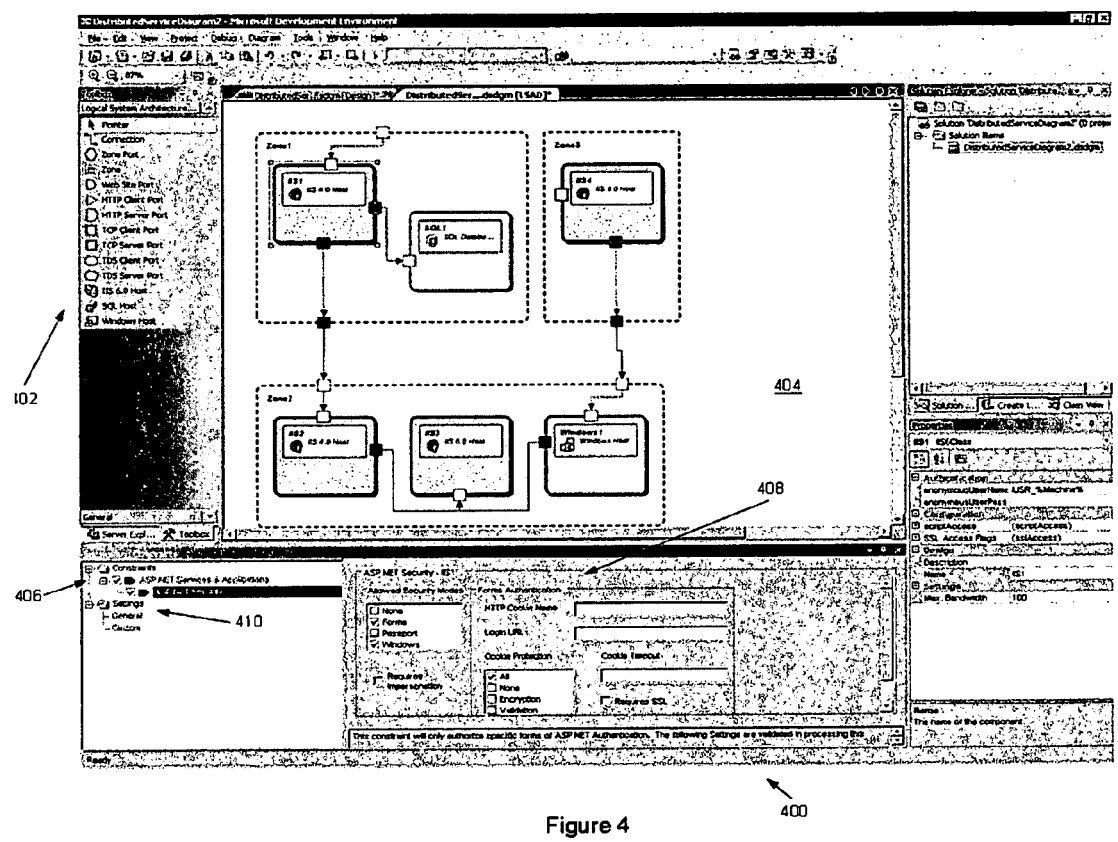
FIG. 4 illustrates a design surface that may be used to develop a hosting environment, in accordance with an embodiment of the invention.

FIG. 4 illustrates a design surface 400 that may be used to develop a hosting environment, in accordance with an embodiment of the invention. Elements may be selected from column 402 and dragged into region 404. Constraints that the hosting environment will impose on the application may be listed in sections 406 and 408. Constraints section 406, for example, indicates that the hosting environment is imposing the constraint of requiring the application to use ASP.NET security. Application settings may be set by making appropriate selection in section 410. There can be any number of constraints that, when selected, in section 406 will cause a new section to replace section 408, The setting options for hosting environments may be obtained from abstract type model documents 208.

A settings and constraints editor 210 may be invoked in step 203 to allow a developer to select settings and define constraints. In an alternative embodiment, settings and constraints editor 210 may be part of development tool 200.

In step 204, settings and constraints editor 210 receives settings and constraints data from development tool and operates on concrete type model documents 212 in step 205. Concrete type model documents 212 may be similar abstract type model documents 208 but include specific settings and constraints.

Figure 5:
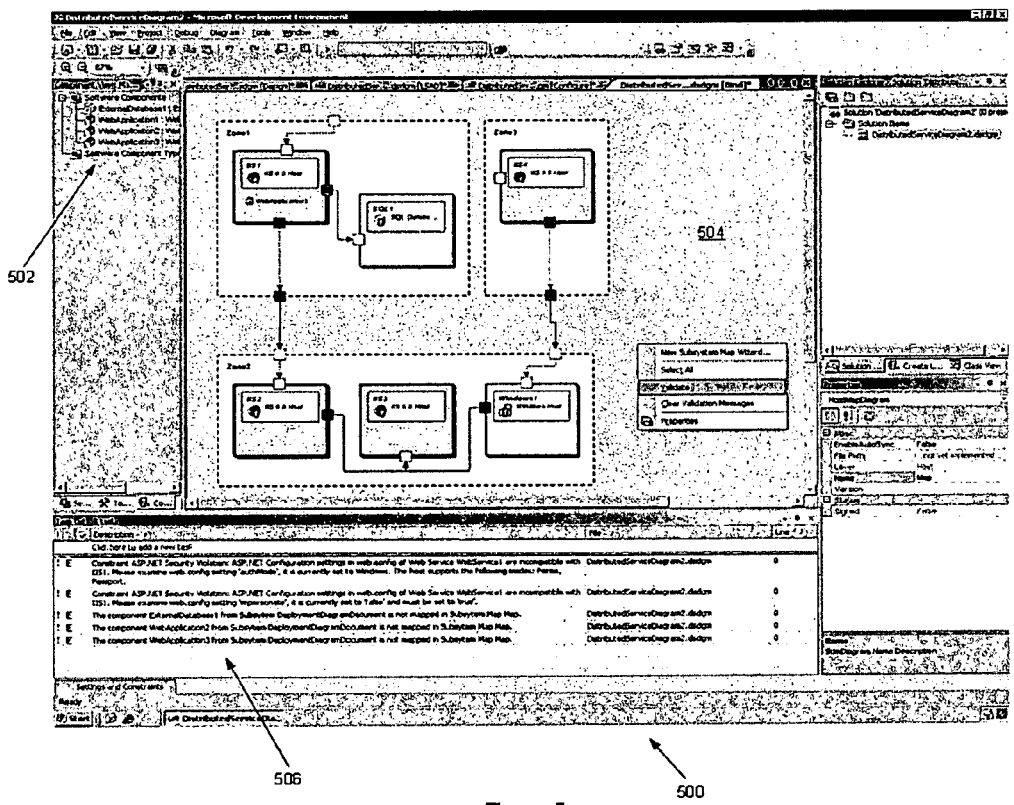
FIG. 5 illustrates a design surface that may be used to bind an application to a hosting environment, in accordance with an embodiment of the invention.

FIG. 5 illustrates a design surface 500 that may be used to bind an application to a hosting environment. Application modules included in section 502 may be selected and dragged to the hosting environment elements shown in section 504. In one embodiment of the invention, design tool 200 creates concrete type model documents that use the System Definition Model (SDM) to model applications and hosting environments in step 207. After an application is bound to a hosting environment, concrete type model documents are passed to a validation module 214 in step 209. Validation module 214 may be accessed by, or be part of, development tool 200.

Validation module 214 compares the models of the application and hosting environment included in concrete type model documents 212 to determine whether application settings satisfy hosting environment constraints and/or. hosting environment settings satisfy application constraints. Validation results may then be passed back to development tool 200.

Section 506 of design surface 500 (shown in FIG. 5) lists validation errors. In one embodiment of the invention, some or all of the errors listed in section 506 include links to the user interface elements that failed the validation step. For example, if an error listed in section 506 relates to a configuration error for web application 1, selecting a link may generate section 304 (shown in FIG. 3) with element 312 highlighted or marked. In one embodiment error icons may be displayed next to the relevant elements.

Figure 6:
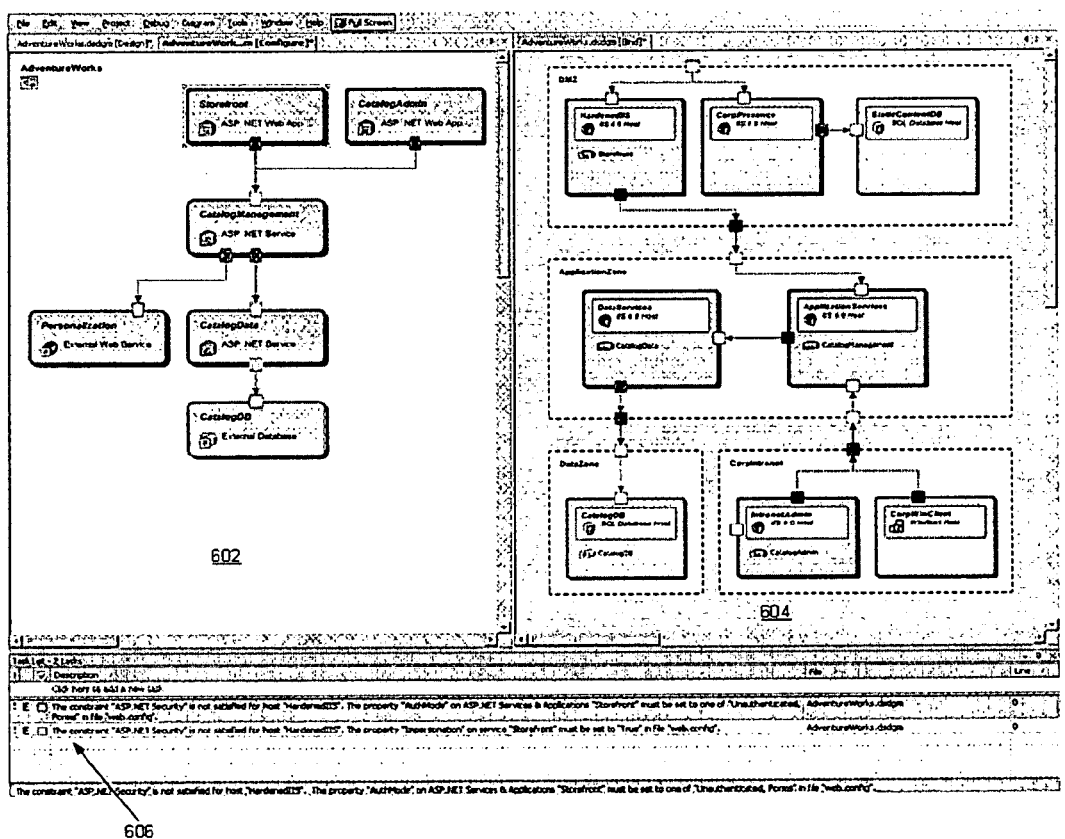
FIG. 6 illustrates an alternate design surface for binding applications to hosting environments.

FIG. 6 illustrates an alternate design surface for binding applications to hosting environments. The application elements shown in section 602 may be bound to the hosting elements shown in section 604 by dragging the application elements to the hosting elements. Section 606 may list validation errors that are generated in the manner described above.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of designing a system, utilizing a computer system comprising a processor and system memory, that includes a computer application hosted on a hosting environment, the method comprising:
   (a) during development phase of the system via the computer system, modeling a particular hosting environment including
      (1) configuring hosting environment settings for the particular hosting environment, and
      (2) identifying one or more device-specific constraints that are imposed by the hosting environment on prospective applications to be hosted on the particular hosting environment;
   (b) during development phase of the system, modeling a particular application including
      (1) configuring application settings for the particular application, and
      (2) identifying constraints imposed by the particular application on a prospective hosting environment of the particular application; and
   (c) during development phase of the system, validating the design of the system by
      (1) comparing the hosting environment settings to the constraints imposed by the particular application, and
      (2) comparing the application settings to the device-specific constraints imposed by the hosting environment.

2. The method of claim 1, wherein the constraints imposed by the particular application or the hosting environment include configuration parameters.

3. The method of claim 1, wherein (c) comprises:
analyzing the application settings to determine whether the application settings satisfy the constraints imposed by the hosting environment.

4. The method of claim 1, wherein (c) comprises:
analyzing the hosting environment settings to determine whether the hosting environment settings satisfy the constraints imposed by the application.

5. The method of claim 1, wherein the particular hosting environment comprises a distributed computing system.

6. The method of claim 1, wherein the particular hosting environment comprises a plurality of server computers.

7. The method of claim 1, wherein the particular hosting environment comprises a logical computer workstation.

8. The method of claim 1, further including after (c):
   (d) displaying on a display device a list of constraint conditions that are not satisfied.

9. The method of claim 8, further including:
   (e) displaying a link in the list of constraint conditions that are not satisfied that links a condition in the list to a diagram that illustrates the condition.

10. The method of claim 1, further including after (c):
displaying on a display device an error icon when a constraint is not satisfied.

11. The method of claim 1, wherein (a) comprises creating a system definition model document 12. The method of claim 1, wherein (b) comprises creating a system definition model document.

13. A design tool for validating application and hosting environment settings and constraints, the design tool comprising:
   a module for modeling a particular application during development phase of the application by
      setting application settings for the particular application, and
      receiving a user designation of one or more constraints imposed by the particular application on a prospective hosting environment of the particular application;
   a module for modeling a particular hosting environment during development phase of the application by
      setting configurable hosting environment settings for the particular hosting environment, and
      receiving a user designation of one or more device-specific constraints that are imposed by the hosting environment on prospective applications to be hosted on the particular hosting environment model; and
   a validation module that performs at least one of the following during development phase of the application:
      determining whether the application settings satisfy the device-specific constraints imposed by the hosting environment, and
      determining whether the hosting environment settings satisfy the constraints imposed by the particular application.

14. The design tool of claim 13, wherein the validation module determines instances where the application settings do not satisfy the device-specific constraints imposed by the hosting environment.

15. The design tool of claim 13, wherein the validation module determines instances where the hosting environment settings do not satisfy the constraints imposed by the particular application.

16. The design tool of claim 13, wherein the particular hosting environment comprises a distributed computing system.

17. A method of identifying configuration errors for an application bound to a hosting environment during development phase of the application, the method comprising:
   (a) displaying application elements in a first region of a user interface screen;
   (b) displaying hosting environment elements in a second region of the user interface screen, at least one of the hosting environment elements representing a device in the hosting environment;
   (c) in response to a command from a user, moving elements from the first region to locations in the second region to bind application elements to hosting environment elements;

(d) receiving during development phase of the application via a design tool a user-designated hosting environment constraint imposed on the application or a user-designated application constraint imposed on the hosting environment;

(e) using the design tool to validate the design during development phase of the application by analyzing application and hosting environment settings to determine whether the settings satisfy hosting environment and application constraints, respectively, including the user-designated constraint; and (e) displaying during development phase of the application both validation errors in a third region of the user interface screen as well a link to each hosting environment element that failed validation.

* * * * *